United States Patent
Buhl et al.

[19]

[11] Patent Number: 5,861,558
[45] Date of Patent: Jan. 19, 1999

[54] STRAIN GAUGE AND METHOD OF MANUFACTURE

[75] Inventors: Timothy R. Buhl, Upper Saddle River, N.J.; Steve Soos, Whitchurch, England

[73] Assignee: Sigma-Netics, Inc., Fairfield, N.J.

[21] Appl. No.: 807,468

[22] Filed: Feb. 27, 1997

Related U.S. Application Data

[60] Provisional application No. 60/012,440, Feb. 28, 1996.

[51] Int. Cl.$^6$ ....................................................... G01B 7/16
[52] U.S. Cl. ................................................ 73/777; 73/721
[58] Field of Search ............................ 73/760, 763, 774, 73/775, 777, 721, 727

[56] References Cited

U.S. PATENT DOCUMENTS

| | | |
|---|---|---|
| 3,196,668 | 7/1965 | McLellan . |
| 3,425,864 | 2/1969 | Morey . |
| 3,675,317 | 7/1972 | Martin et al. . |
| 3,697,918 | 10/1972 | Orth et al. ................................ 73/777 |
| 3,838,379 | 9/1974 | Gieles et al. . |
| 4,047,144 | 9/1977 | Wong ........................................ 73/777 |
| 4,133,100 | 1/1979 | Myhre . |
| 4,217,783 | 8/1980 | Ito et al. . |
| 4,311,980 | 1/1982 | Prudenziati . |
| 4,481,497 | 11/1984 | Kurtz et al. . |
| 4,485,387 | 11/1984 | Drumheller . |
| 4,605,919 | 8/1986 | Wilner ....................................... 73/777 |
| 4,618,844 | 10/1986 | Takahashi et al. ........................ 73/777 |
| 4,726,232 | 2/1988 | Koneval . |
| 4,771,261 | 9/1988 | Benini . |
| 4,777,826 | 10/1988 | Rud, Jr. et al. . |
| 4,825,536 | 5/1989 | Itemadani et al. . |
| 4,898,035 | 2/1990 | Yajima et al. . |
| 4,932,265 | 6/1990 | Skuratovsky et al. . |
| 4,972,579 | 11/1990 | Yajima . |
| 4,984,467 | 1/1991 | Haefner . |
| 5,255,427 | 10/1993 | Hafner . |
| 5,521,576 | 5/1996 | Collins . |

*Primary Examiner*—Max H. Noori
*Attorney, Agent, or Firm*—Lerner, David, Littenberg, Krumholz & Mentlik

[57] ABSTRACT

A pressure sensor has resistive elements for measuring strain on the surface of a diaphragm. Each resistive element has first and second metallic pads with at least two lines of piezoresistive material formed between the pads, each exhibiting a high length to width aspect ratio. The pressure gauge may be of a one piece, cup-shaped construction having a diaphragm forming the floor of the cup. The internal diameter of the cup is less than 10 mm, and piezoresistive, thick film elements are formed on the inside surface of the diaphragm. The piezoresistive elements may be formed using a pen to trace a pattern of resistive ink on the substrate surface, using a stencil or using electrostatic spraying of the resistive ink onto the substrate surface.

20 Claims, 6 Drawing Sheets

STRAIN GAUGE AND METHOD OF MANUFACTURE

The present application claims the benefit of United States Provisional Application, Serial No. 60/012,440 filed Feb. 28, 1996, the disclosure of which is hereby incorporated by reference herein.

BACKGROUND OF THE INVENTION

The present invention relates generally to the use of thick film technology for forming resistive elements on ceramic substrates for the measurement of strain. More particularly, the invention relates to the use of such technology in ceramic diaphragm pressure gauges.

It is generally known in the art to use resistive strain gauge technology in the measurement of differential pressure by attaching piezoresistive elements to a diaphragm in order to measure the strain in the diaphragm as the diaphragm is deflected by the applied pressure. The term "differential pressure" as used herein shall mean a difference in pressure between the first side and the second side of the diaphragm. The first side has the pressure to be measured applied to it and the second side has a reference pressure applied that may be any pressure commensurate with the design, including a vacuum. The term "piezoresistive element" as used herein shall mean an element that undergoes changes in its electrical resistance properties when subjected to strain. To use piezoresistive elements to measure differential pressure, the elements are incorporated in a bridge circuit for measuring changes in resistance, which are translated into pressure values. The term "bridge" as used herein shall mean an electrical configuration used for balancing voltages, otherwise known as a "Wheatstone Bridge." An example of such a pressure sensor is disclosed in U.S. Pat. No. 4,771,261, in which a flat, ceramic diaphragm member has a face on which thick-film piezoresistive elements are formed. These elements are interconnected with circuitry also formed on the diaphragm. The diaphragm is bonded around its outside edge to a disk-shaped support with the circuitry and piezoresistive elements facing the support. The support includes a central recess to permit deflection of the diaphragm. Holes in the support provide for interconnection of the circuitry printed on the diaphragm with remote circuitry printed on the reverse side of the support.

In general, the piezoresistive elements, as well as the circuitry interconnecting those elements, are "thick-film" images formed on the ceramic substrate using a silk screen printing process. Both the piezoresistive elements and the interconnecting circuitry are applied to the substrate in the form of an ink or paste, comprising a conductor such as a noble metal, a dielectric and an organic adherent. The components are cured at a high temperature after being applied to the substrate, burning away the organic component.

Because the piezoresistive elements are applied using a silk screen printing process, resolution is limited, and the practical lower limit for the width of a resistor line formed in this manner is approximately 0.50 mm. Additionally, the sensitivity of the bridge circuitry used in conjunction with such strain gauges requires a minimum conductivity of the resistive elements, further limiting the minimum width of the resistors.

The resistors generally contain a much lower concentration of noble metal than do the circuit pads they connect. During firing, there is therefore a tendency for the noble metal in the circuit pads to leach into the piezoresistive elements and for some of the constituent parts of the resistive ink to be scavenged by the metal pads, causing undesirable thermal effects, increasing the conductivity of the piezoresistive elements, and thus adversely affecting gauge precision. This problem is aggravated by the minimum width required in the piezoresistive elements as discussed above. As the width of the piezoresistive elements increases for any fixed length, so does the leaching problem. It is desirable to create a piezoresistive element that has a high length to width aspect ratio, the former dimension being greater than the latter.

It is also known to combine the ceramic diaphragm and the support component into a one-piece unit, as disclosed in U.S. Pat. No. 4,898,035 to Yajima et al. That patent discloses an integrally formed ceramic cup-shaped sensor housing incorporating a diaphragm as well as a cylindrical wall. The piezoresistive elements are formed on the inside surface of the diaphragm facing the inside of the cylindrical wall. The elements are formed using a printing process. Known screen printing processes, however, do not permit placing the resistive element in an optimum position close to the corner formed by the diaphragm and the cylindrical walls, where strain created by deflection of the diaphragm is a maximum. Further, the internal diameter of the cup must exceed a minimum size in order to provide sufficient clearance for screen printing the resistors and circuitry on the base. There is therefore a need for an improved process for applying the resistive ink that permits the formation of strain gauge elements within confined spaces.

Still further improvements in the art would be desirable. In particular, there is a need for a piezoresistive element for a strain gauge having increased sensitivity while at the same time having sufficiently high conductivity to permit accurate measurements using a bridge circuit. In addition, there is a need for a method for applying resistive ink to the ceramic substrate capable of forming extremely thin lines having a high aspect ratio, and permitting the formation of such lines in confined spaces such as the inside of a small, cup-shaped ceramic pressure sensor.

SUMMARY OF THE INVENTION

The present invention addresses these needs.

One aspect of the present invention provides a piezoresistive element for measuring strain on the surface of a substrate. The piezoresistive element has first and second metallic pads spaced apart on the surface of the substrate, and at least two piezoresistive lines formed on the surface and arranged proximate with and substantially parallel to one another. Each of the piezoresistive lines is electrically connected to the first and second metallic pads. The metallic pads may be a noble metal or an alloy of a noble metal. The noble metal may be palladium, platinum, gold or another metal. Because the resistive element comprises a plurality of lines instead of a single, thick element, leaching of noble metal from the metallic pads into the lines is reduced, increasing the sensitivity of the piezoresistive element and reducing adverse thermal effects.

The piezoresistive lines may comprise lines of cured resistive ink. The term "cured" as used herein shall refer to resistive ink that has been dried and fired to a known temperature/time profile. The lines may have diffusion zones in which metal from the pads has diffused to form a mixture of metal and piezoresistive ink in zones around the interface between the metal pads and the piezoresistive ink. The resistive ink may have a typical width of 0.1 mm and a typical length of 0.7 mm, giving a length/width aspect ratio of 7:1.

Another aspect of the invention provides a sensor for measuring the pressure of fluid, including either a liquid or a gas. The sensor has a disc-like support member with a face having a peripheral raised portion defining a central recess, and a disk-like diaphragm having a first side for facing the fluid and a second side opposite the first side. The diaphragm is mounted on the face of the support for deflecting into and out of the recess. A bridge circuit is provided on the second side of the diaphragm and has a plurality of pads arranged in pairs. A plurality of resistive strain sensors are also disposed on the second side of the diaphragm. Each of the strain sensors comprises at least two lines of cured resistive ink arranged proximate with and substantially parallel to one another. Each line of each strain sensor interconnects both pads of a pair.

Another sensor for measuring the pressure of a fluid has a cup-shaped substrate with a hollow, cylindrical wall and a disk-like diaphragm closing one end of the wall. The diaphragm has an inside surface facing into the cylindrical wall. The cylindrical wall has an inside diameter of less than 10 mm. A connecting circuit on the inside surface of the diaphragm has a plurality of pads arranged in pairs. A plurality of thick-film piezoresistive elements are also disposed on the inside surface of the diaphragm and interconnect the pairs of pads. Each strain sensor may have at least two lines of cured resistive ink arranged proximate with and substantially parallel to one another. Each of the lines of the strain sensor interconnects both pads of the pair. The connecting circuit may further have conductive traces formed on the second side of the diaphragm and also formed on an inside surface of the cylindrical wall.

In a method of making the strain gauge piezoresistive element according to the invention, a ceramic substrate having a surface is first provided. A pair of metallic pads are formed on the substrate surface, and a linear path is traversed between the metallic pads with a pen applying a resistive ink. The pen deposits a line of resistive ink on the substrate surface interconnecting the pair of metallic pads. The deposited resistive ink is then cured to form the strain gauge element. This method forms piezoresistive lines having smoother edges, improved aspect ratio and greater resolution than those formed using methods of the prior art. The method can therefore be used to form very fine lines. This method is also particularly useful in forming piezoresistive elements, conductive pads and traces in confined spaces, because the pen may be designed with a very small footprint. The method may be used, for example, to form piezoresistive elements, conductive pads and traces on diaphragms and on the upstanding walls inside cup-shaped sensor bodies.

The method may also include traversing a second linear path between the metallic pads with the pen applying resistive ink. In that case, a second line of resistive ink is deposited on the substrate surface interconnecting the pair of metallic pads. Furthermore, the metallic pads and conductive traces themselves may be formed by forming areas of conductive ink on the substrate using a pen, and curing those areas to form pads and conductive traces both horizontally and vertically on the substrate.

Another aspect of the invention comprises a strain gauge having a piezoresistive element formed in accordance with the above process.

In yet another aspect of the invention, another method is provided for making a strain gauge piezoresistive element. A ceramic substrate having a surface is provided, and a pair of metallic pads are formed on the substrate surface. A stencil is placed in proximity with the substrate such that a slot in the stencil overlaps and extends between the metallic pads. The term "stencil" as used herein refers to a solid object having a fully clear aperture, as opposed to a "silk screen," which comprises a fine grid of apertures, some of which are blocked to prevent the passage of ink or paint. After positioning the stencil, resistive ink is passed through the slot to deposit a line of resistive ink on the substrate surface interconnecting the pair of metallic pads. The deposited resistive ink is then cured to form the piezoresistive element.

The stencil may be brought into contact with the substrate, and the resistive ink may then be spread across the stencil so that that a portion of the resistive ink passes through the slot onto the substrate and the pads. Alternatively, the resistive ink may be passed through the slot to form a meniscus of resistive ink protruding from the slot in a direction facing the substrate surface. The meniscus is brought into contact with the substrate surface and the pads so that a line of resistive ink is deposited onto the substrate and the pads.

The resistive ink may also be delivered to the stencil through a nozzle, and the nozzle may be electrically charged with respect to the substrate such that air between the nozzle and the substrate is ionized. The charged particles of resistive ink are thereby drawn to the substrate surface and the rate of ink deposition can be accurately controlled. The invention also includes a strain gauge having a resistive element formed in accordance with this process.

These and other objects, features and advantages of the present invention will be more readily apparent from the detailed description of the preferred embodiment set forth below, taken in conjunction with the accompanying drawings.

DETAILED DESCRIPTION OF THE PREFERRED EMBODIMENT

Figure 1:
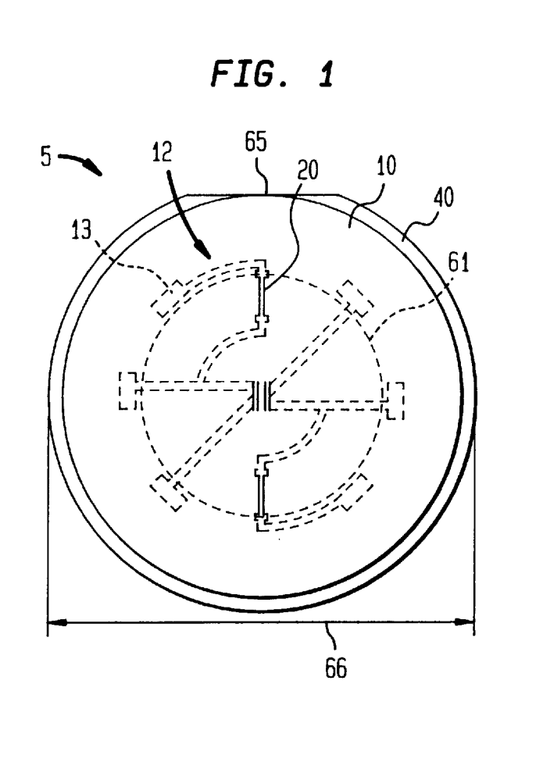
FIG. 1 is a top view of a pressure sensor according to one embodiment of the present invention.
Figure 2:
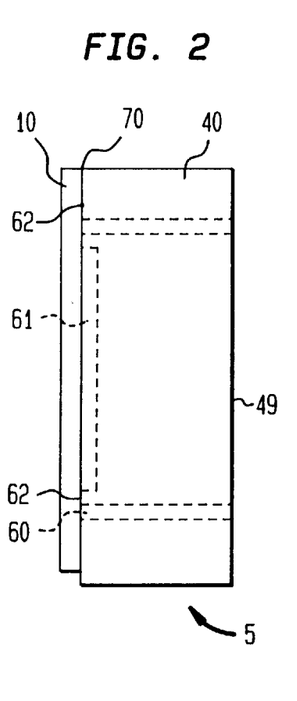
FIG. 2 is a side view of the pressure sensor of FIG. 1.
Figure 3:
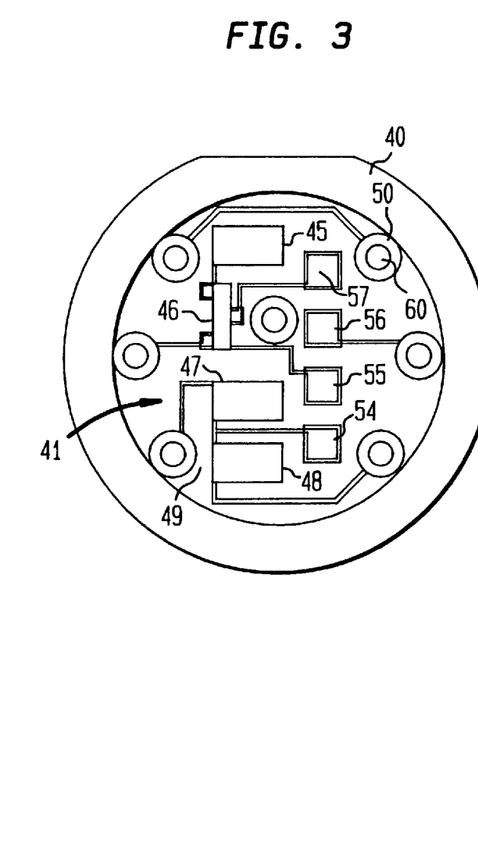
FIG. 3 is a bottom view of the pressure sensor of FIG. 1.

A pressure gauge 5 according to the invention, shown in FIGS. 1–3, comprises a diaphragm 10 and a support 40 connected by a layer of sealing and bonding glass 70. The support 40 has a central recess 61 surrounded by an annular raised portion 62, to which the diaphragm 10 is bonded using bonding glass 70. Both the diaphragm 10 and the support 40 are formed of a ceramic material and are preferably formed of an alumina ceramic. Most preferably, those components are formed from A476 96% alumina ceramic.

Figure 6:
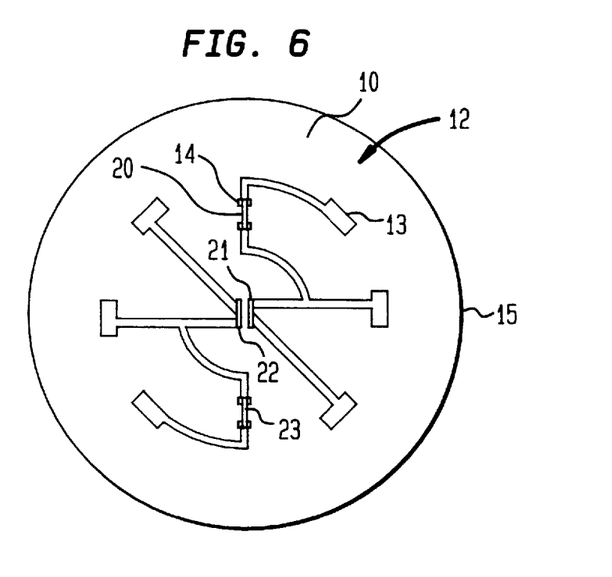
FIG. 6 is a bottom view of a diaphragm comprising an element of the pressure sensor of FIG. 1, showing piezoresistive strain gauge elements and associated circuitry.

The diaphragm 10 is a flat, disk-shaped ceramic component having circuitry 12 including the piezoresistive gauge elements 20 on one surface. The surface containing the circuitry 12 faces the support 40 after the diaphragm 10 and the support 40 are joined. The thickness of the diaphragm is selected for the pressure range to be measured. For example, in an application for the measurement of high pressure in the range of about 17 MPa–82 MPa, a diaphragm approximately 1.5 mm thick is used. On the other hand, for low pressure applications in the range of about 100 kPa–2.4 MPa, a diaphragm approximately 0.245 mm thick is used.

The support 40 includes additional circuitry 41 on the surface 49 facing away from the diaphragm 10. That circuitry comprises the peripheral circuitry of a bridge circuit, including a span resistor 45, a span thermal compensation diode 46 and two zero resistors 47, 48. That circuitry, together with the circuitry on the diaphragm 10 and interconnections therebetween, form a bridge circuit for measuring changes in the resistance of piezoresistive elements 20 upon deflection of the diaphragm 10 by differential pressure across the diaphragm. Pads 54–57, also on the support 40, provide connections to external recording and display circuitry.

To assemble the pressure gauge 5, the thin sealing and bonding glass 70 (FIG. 2) is placed on the annular raised portion 72 and the diaphragm 10 is placed on top of the sealing glass with the circuitry 12 facing the support 40. The assembly is then heated to a firing temperature of approximately 550° C., melting the sealing glass to form a seal and a bond between the diaphragm and the support. Holes 60 through the support are provided in order to pass conductors (not shown) from the circuitry 12 on the diaphragm to the circuitry 41 on the support. Interconnection pads 13, which form a part of the circuitry 12 on the diaphragm, are aligned with the holes 60 for this purpose before bonding. The conductors may be wires or may be a coating applied within the holes 60.

Figure 4:
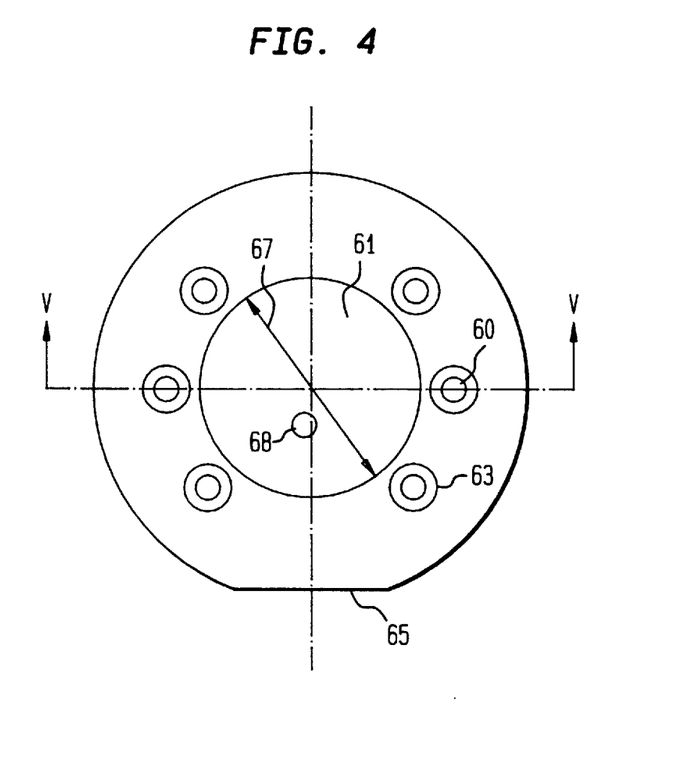
FIG. 4 is a top view of a support comprising an element of the pressure sensor of FIG. 1.
Figure 5:
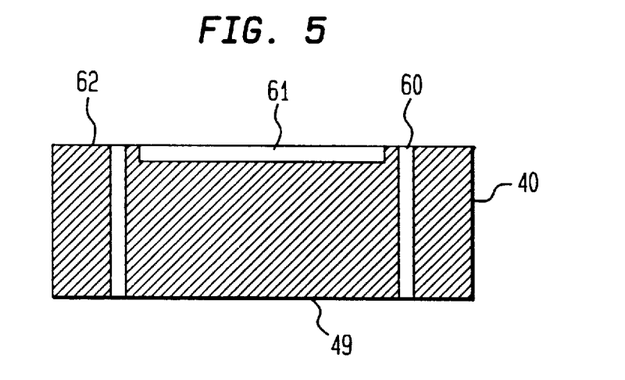
FIG. 5 is a sectional view of the support of FIG. 4, through line V—V.

A flat 65 is provided on the external cylindrical surface of the support 40 for orientation. In one example of the pressure gauge of the invention, the external diameter 66 (FIG. 1) is between 18 and 19 mm. The diameter 67 of the recess 61 is adjusted to correspond with the intended pressure range, and may be approximately 10 mm for a low to medium pressure range, and approximately 5 mm for a high pressure range. An additional hole 68 (FIG. 4) is provided in the support 40 in order to vent the area enclosed by the recess 61 and the diaphragm 10. If the diaphragm is to be referenced to any other pressure, the entire assembly is exposed to the reference pressure and the hole 68 is then sealed, thus sealing the reference pressure inside the device. The circuitry 41 on the bottom face of the support 40 may be formed using either thick film or thin film technology as is known in the art.

Figure 7:
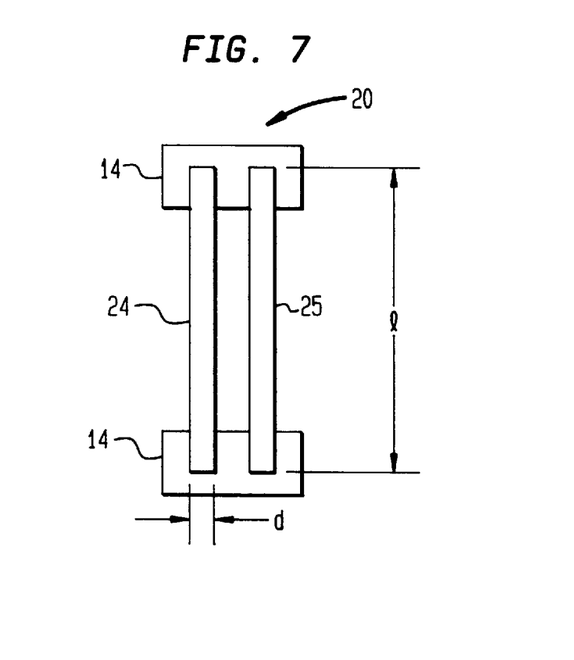
FIG. 7 is an enlarged view of the piezoresistive strain gauge element of FIG. 6.

The circuitry 12 on the diaphragm 10 includes four piezoresistive elements 20–23 (FIG. 6); two are formed at the center and two are formed near the sides of the diaphragm, as shown in FIG. 7. The piezoresistive elements are interconnected by conductive runs 15, which also connect the piezoresistive elements 20–23 with pads 13. The pads 13 and conductive runs 15 contain a noble metal or an alloy of a noble metal. In a preferred embodiment, those components are formed of an alloy of palladium, platinum and gold. The pads 13 and the conductive runs 15 are formed using thick film technology, wherein particles of the noble metal alloy and particles of a dielectric such as lead borosilicate glass are mixed with an organic adherent, to form a conductive ink or paste. The conductive ink is applied to the diaphragm 10 to form the interconnect pads 13 and conductive runs 15. The ink is then allowed to dry and is cured at a temperature of approximately 850° C. The organic adherent is burnt away during curing, leaving the circuitry on the surface of the diaphragm.

The piezoresistive elements 20–23 interconnect pairs of resistor pads 14 formed integrally with and of the same material as the conductive runs 15 and interconnect pads 13. The pads 14 are formed at the termini of the conductive runs 15. The piezoelectric elements are formed of a resistive ink having components similar to those of the conductive ink discussed above; i.e., metal, dielectric and organic components. The resistive ink, however, contains a much lower concentration of metal, considerably reducing the conductivity of the piezoresistive elements 20–23 as compared with the conductive runs 15 and pads 13 and 14.

The piezoresistive elements 20 change in electrical resistivity as they are subjected to strain of the diaphragm. The piezoresistive elements 20 and 23 are placed near the edge of the diaphragm where the diaphragm is bonded to the annular raised portion of the support 40. At that location, the piezoresistive elements are subjected to a relatively high radial compressive strain when the diaphragm is subjected to a positive pressure from the side of the diaphragm opposite the circuitry 12. The piezoresistive elements 21 and 22 are placed near the center of the diaphragm, which is subjected to relatively high tensile strain when the diaphragm is subjected to the same pressure. Relative changes in resistivity on the piezoresistive elements is converted to a pressure reading using the bridge circuitry of the pressure sensor, as is known in the art.

Each of the piezoresistive elements, such as element 20 (FIG. 7), comprises two thin lines 24, 25 interconnecting the resistor pads 14. The lines 24, 25 are formed by applying a resistive ink directly onto the diaphragm 10. In a preferred embodiment, the lines 24, 25 are applied between and overlapping the pads 14 after the pads 14 have been cured by firing. The lines 24, 25 are then heated to a firing temperature of approximately 850° C. and cured, forming the piezoresistive element 20.

Figure 8:
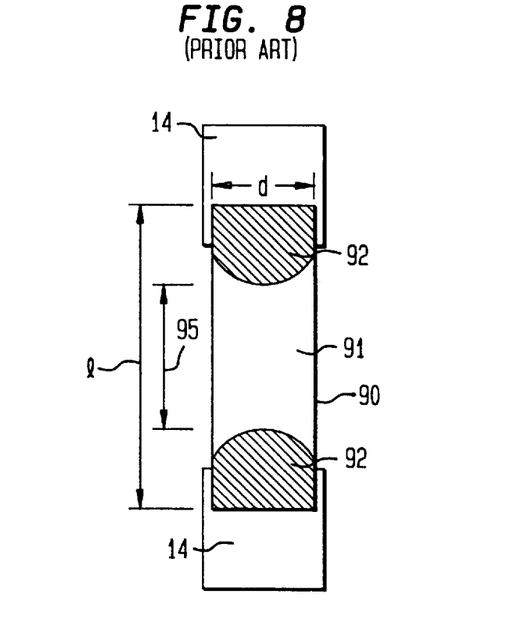
FIG. 8 is an enlarged schematic view of a piezoresistive strain gauge element of the prior art.

As the piezoresistive elements are cured, noble metal from the pads 14 leaches into the piezoresistive material, greatly increasing its conductivity in zones near the pads 14. This phenomenon adversely affects the performance of a piezoresistive element by decreasing its effective length. For example, as shown in FIG. 8, a prior art piezoresistive element 90 has regions 92 contaminated by noble metal leached from the pads 14 during firing. An uncontaminated region 91 remains between the two regions 92. While in reality the interface between the contaminated and uncontaminated regions of the piezoresistive element is a gradient, an effective functional length 95 of the piezoresistive element may be said to represent the length of an uncontaminated piezoresistive element having the same piezoresistive effect.

A shorter piezoresistive effective length results in a less sensitive pressure sensor and more importantly, the ratio between the contaminated and uncontaminated region is low, thus causing undesirable thermal effects. This is because the change in resistance caused by strain is proportional to the length of the piezoresistive element; i.e., a longer piezoresistive element undergoes a greater change in resistivity for a given strain of the diaphragm. Thus, for piezoresistive elements mounted on the diaphragm of a pressure sensor, the longer the effective length of the elements, the larger the change in resistance for a given change in pressure, and the greater the overall sensitivity and thermal performance of the pressure sensor. Furthermore, the shorter the piezoresistive element, the greater the proportion of the total element that is contaminated by the noble metal, leading to non-linear effects and thermal performance degradation.

The maximum length of the piezoresistive elements, however, is limited by other factors. First, the overall resistance of a piezoresistive element increases with length. Thus, a long piezoresistive element has a high resistance, requiring more sensitive circuitry to measure relative changes in resistance. Second, the longer the piezoresistive element, the further it extends beyond a theoretical point of maximum strain, reducing the sensitivity of the instrument.

Although the present invention is not limited by any theory of operation, it is believed that the shape and size of the contaminated regions 92 are largely a function of the aspect ratio between width d and the effective length 95 of the piezoresistive element. An increased width, while maintaining the length, provides an increased interface area between the pads 14 and the element 91 for metal leaching to occur and reduces the aspect ratio between the length and width. It is further believed that the contamination pattern 92 has a bulge extending outward from the pads 14 to a maximum at the center of the width d of the element 91 (FIG. 8), and that increasing the width d therefore results in greater extension of the region 92 into the element, further reducing the element's performance.

In practice, the minimum width of a prior art piezoresistive element, like the maximum length, is controlled by a maximum tolerable overall resistance of the element and capability of the screen printing process, which affect the sensitivity of the gauge. Given these constraints, a typical thick-film piezoresistive element of the prior art has a width d of approximately 0.80 mm and an effective length of approximately 1.0 mm.

The piezoresistive element 20 (FIG. 9) of the present invention has two or more individual lines 24, 25 of piezoresistive material extending between the pads 14. Each of the individual lines 24, 25 has a considerably narrower width than that of a prior art element such as element 91 having the same overall resistance. An aspect ratio, or length/width of the individual lines 24, 25, may be greater than 1.3. An aspect ratio of more than 2 is preferred, with a ratio over 5 being more preferred. An aspect ratio of 7 or greater is most preferred. The preferred width d of the lines 24, 25 is about 0.10 mm for a line 0.70 mm long, resulting in an aspect ratio of about 7. As can be seen schematically in FIGS. 8 & 9, the zone 32 into which metal from the pads 14 leaches is significantly reduced in size and percentage of the total area of the element as compared to the prior art. This results in an increased effective length 35 of the piezoresistive element.

Figure 9:
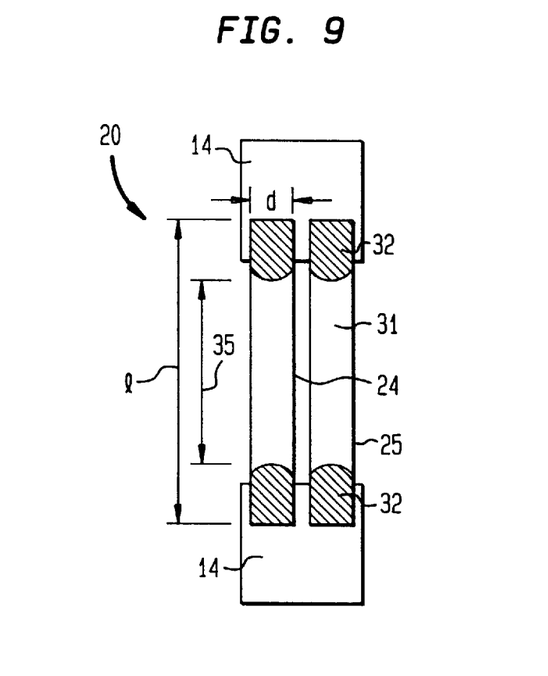
FIG. 9 is an enlarged schematic view of a piezoresistive strain gauge element of the present invention.

Because the individual piezoresistive lines 24, 25 are electrically connected in parallel, the resistance of the individual lines may be relatively high while maintaining the overall resistance of the piezoresistive element 20 within tolerable limits. This makes possible the use of narrow lines, which, as noted, results in reduced contamination. Thus, by using a plurality of narrow lines connected in parallel to form a single piezoresistive element, an increased piezoresistive effect may be realized without unduly increasing the resistivity of the element.

Elements formed using thick film technology are typically applied to the substrate using a screen printing process. Such a process, however, does not have the resolution required to form lines 24, 25 comprising the piezoresistive element 20, each of which have a width d of about 0.1 mm. Furthermore, the screen printing process produces ragged edges that are unacceptable in the formation of the thin lines. In a method according to the invention, a pen 110 (FIG. 10) is used to apply resistive ink to the ceramic diaphragm 10. A suitable machine (not shown) having x-y plotting capability moves the pen 110 in a predetermined path so as to "draw" the piezoresistor image on the ceramic substrate. In one example of such a machine, the pen 110 is magnetically counterweighted (not shown) to apply very little force to the substrate 10. A nozzle 115 on the end of the pen floats on a meniscus 111 formed by the resistive ink deposited on the substrate. The width d of the line (FIG. 9) may be changed by adjusting the magnetic counterweight, thereby changing the degree to which the resistive ink is spread from side to side as the pen travels. One machine that may be used in this process is currently marketed by Ohmcraft of Pittsford, N.Y., and is in use in other electronics applications.

Figure 10:
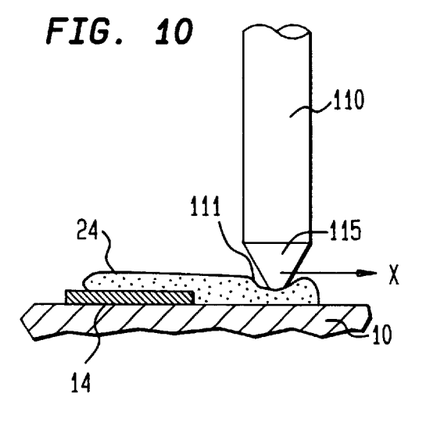
FIG. 10 is a diagrammatic side view depicting a method of making a strain gauge piezoresistive element using a pen according to one embodiment of the invention.

To form a piezoresistive element using this method, the metallic pads 14 are first formed on the surface of the diaphragm 10. A linear path in direction x is then traversed between the metallic pads with the pen 110 while applying resistive ink. The resistive ink is deposited to form a line interconnecting the pair of metallic pads. The pen may then be lifted, repositioned and retraversed to form multiple lines between the same pads 14, and/or to form additional lines between other pairs of pads. The resistive ink is then cured to form a piezoresistive line 24.

A line formed by the pen 10 has comparatively smooth edges. The pen can be adjusted to produce a line less than 0.1 mm in width. The tip of the pen may be configured to provide access to confined or remote locations in a three dimensional substrate geometry. X-y-z plotting capability may be utilized to draw a plurality of lines, such as lines 24, 25 (FIG. 9), between the pads and, if necessary, vertically on the walls of a cup-shaped substrate.

Figure 11:
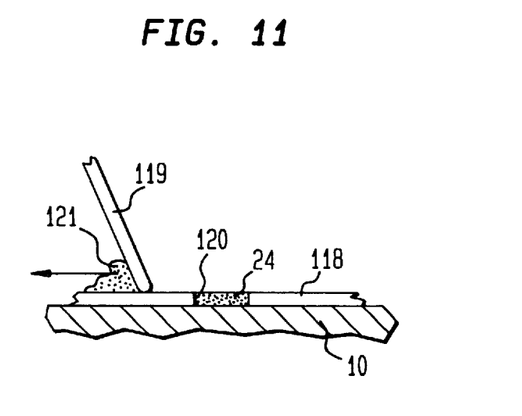
FIG. 11 is a diagrammatic front elevation view of a method of making a strain gauge resistive element using a stencil according to one embodiment of the invention.

In another method for applying resistive ink according to the invention (FIG. 11), a stencil 118 has a slot 120 with a size and shape to produce the line 24 to be formed. The stencil 118 is placed in contact with a substrate such as the diaphragm 10. A mass of resistive ink 121 is spread across the stencil 118 using a tool such as a wiper 119. As the mass 121 passes over the slot 120, the line 24 is deposited on the diaphragm 10. The stencil 118 is then removed, leaving behind the line for subsequent curing as above. The use of a stencil provides improved resolution and line quality as compared to the screen printing methods of the prior art.

Figure 12:
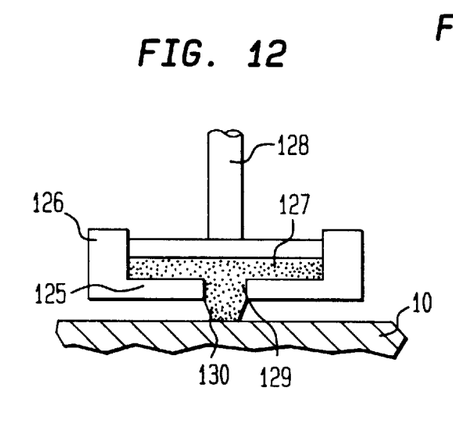
FIG. 12 is a diagrammatic front elevation view of a method of making a strain gauge with a stencil spaced away from the substrate according to one embodiment of the invention.

The resistive ink may also be applied using a stencil 125 spaced away from the substrate, as shown in FIG. 12. In that embodiment, the stencil 125 comprises a lower wall of a reservoir 126 containing a quantity 127 of resistive ink. The reservoir 126 has a means, schematically represented by plunger 128, for forcing a small quantity of the resistive ink 127 through a slot 129 in the stencil by the application of light pressure. The resistive ink is forced through the slot to form a meniscus 130 held in place by surface tension of the ink to the sides of the slot 129. The reservoir 126 is then brought into proximity with the ceramic substrate 10 until the meniscus 130 contacts the ceramic substrate 10 and the pads 14 (not shown in FIG. 12). This contact may be accurately achieved by using a high resolution stepper motor and a fine pitch linear actuator to move the reservoir 126 in the direction of the substrate 10. Contact between the meniscus 130 and the pads 14 may be detected by using the "wet" ink and the contact pads to form two elements of a switch circuit. When the connection between the ink and the pads is made, the movement of the reservoir stops. A predefined dwell period is allowed, and the receptacle is then withdrawn, leaving a fine line on the ceramic surface. This process may be "stepped" along the surface of the ceramic to produce a series of identical lines on the ceramic surface or a plurality of lines may be deposited simultaneously. The lines produced have smooth edges and sufficiently fine resolution to produce the lines 24, 25 of the piezoresistive element 20.

Figure 13:
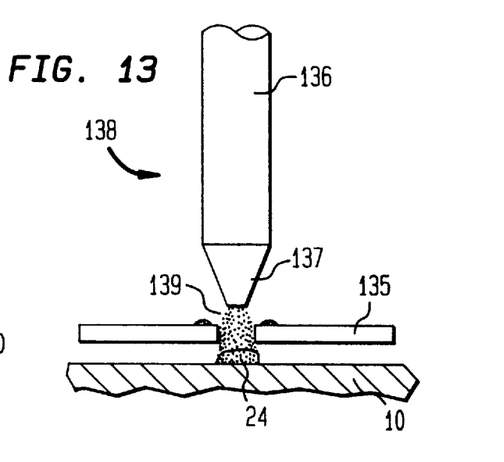
FIG. 13 is a diagrammatic front elevation view of a method of making a strain gauge resistive element using a stencil in combination with charged particles of resistive ink according to one embodiment of the invention.

The lines 24, 25 may alternatively be produced using an electrostatic method in conjunction with a stencil 135, as shown in FIG. 13. In this method, as with the other methods using a stencil, the overall dimensions of the stencil plate 135 do not greatly exceed the actual dimensions of the line to be formed, permitting the stenciling of lines in confined spaces. An ink delivery system 138 comprises a hypodermic needle 136 having a fine nozzle 137. The resistive ink is delivered to the nozzle 137 of the needle 136 by applying a low pressure to a reservoir (not shown) containing a small quantity of resistive ink. The needle 136 is electrically charged to a potential of between 12 and 24 kilovolts DC with respect to the ceramic substrate. When the nozzle 137 is brought into proximity with the substrate, charged particles 139 of resistive ink are drawn to the ceramic surface. The needle 136 need not be accurately positioned, but merely placed in proximity with the slot 134 in the stencil 135. The stencil 135 may also be charged to the same potential as the needle 136 in order to deflect particles 139 of ink into the slot. Alternatively, the stencil 135 may be charged to the same potential as the ceramic substrate, further attracting the particles 139 in the direction of the substrate. The latter embodiment requires increased periodic cleaning of the stencil in order to remove resistive ink drawn to its surface. In another embodiment, the stencil may be eliminated, relying instead on mechanical movement of the needle 136 itself.

Figure 14:
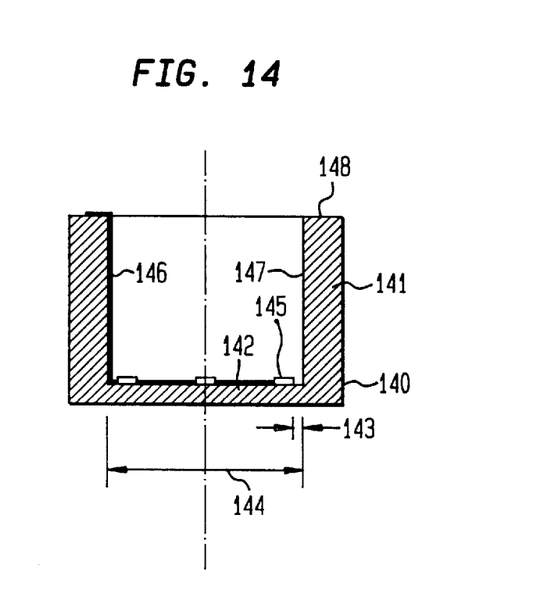
FIG. 14 is a sectional view taken through the center of a pressure gauge having a cup-shaped housing according to one embodiment of the invention.
Figure 15:
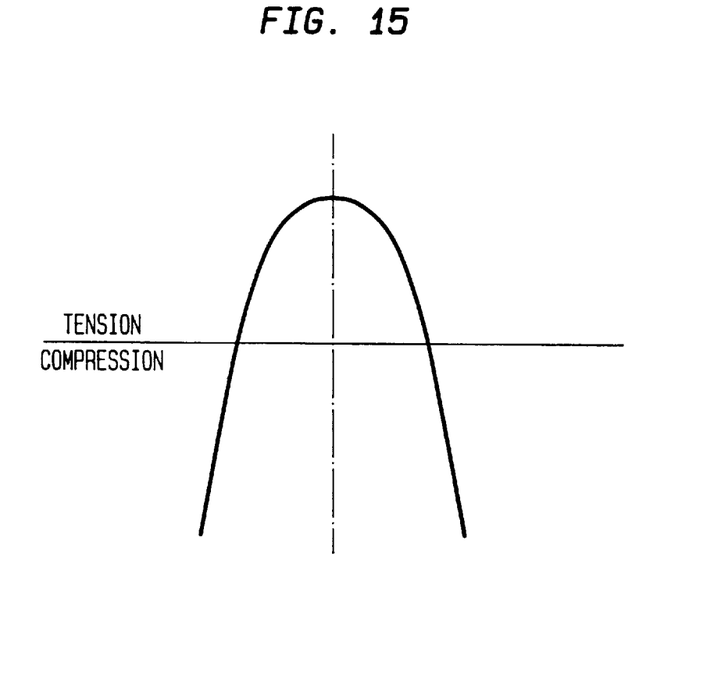
FIG. 15 is a diagrammatic depiction of strain versus radial position on a deflected diaphragm of the pressure gauge of FIG. 14.

Another pressure sensor 140 of the invention, shown in FIG. 14, has a one piece construction resembling a cup. A diaphragm 142 forms the bottom of the cup, while an annular wall 141 forms the wall of the cup. The wall has an inner surface 147 defining an interior of the cup. Piezoresistive elements such as element 145 are formed on the surface of the diaphragm 142 facing the inside of the cup. The entire one piece sensor housing 140 is formed of a ceramic such as A 476 96% alumina ceramic. The internal diameter 144 of the upstanding wall 141 may be as small as 5 mm for high pressure applications. This relatively small diameter, combined with the height of the upstanding wall, which may exceed 6 mm, forms a restricted space that presents a significant problem in forming the piezoresistive elements. Furthermore, as shown in FIG. 15, the maximum compressive strain on the inside wall of the diaphragm 142 is located adjacent the wall 141. Thus, the optimum location for the piezoresistive element 145 is also adjacent that wall; i.e., the distance 143 from the piezoresistive element 145 to the wall 141 should be minimized. This presents additional challenges in forming the piezoresistive elements 145 on the inside surface of the diaphragm 142.

By using the pen 110 as shown in FIG. 10, the piezoresistive element 145 may be formed to within a minimum distance 143 from the wall 141, e.g. to within about 0.25 mm of the wall. Further, the piezoresistive elements may be formed within a diameter 144 as small as 5 mm or smaller. The electrostatic deposition technique according to the invention, as shown in FIG. 13, or the other methods using a stencil, may also be used for form such piezoresistive elements.

A one piece pressure sensor housing 140 is preferred in some applications as compared to the two-piece assembly as shown in FIGS. 1–3 because in the cup-shaped design no trapped volume is formed between the diaphragm and the support and, because the design is homogeneous in nature, instead of two components bonded together, the strain pattern achieved in practice is much closer to theoretical pattern shown in FIG. 15. Further, the one-piece design has reduced susceptibility to failure at the joint between the diaphragm and the support.

In addition to piezoresistive elements 145, conductive circuitry (not shown) similar to that used in the diaphragm design (FIG. 6) may also be formed on the inside surface of the diaphragm 142. The pen or electrostatic methods of resistive ink application are especially suited for this for the same reasons they are suited for applying the piezoresistive elements 145. In addition, electrical connection may be made between the circuitry on the inside surface of the diaphragm 142 and the upper surface 148 of the upstanding wall 141, in order to connect the strain gauge with the remaining bridge circuitry. Conductive runs 146 may be formed on the inside surface 147 of the upstanding wall 141, using a pen to apply thick film resistive ink as shown in FIG. 10. This technique avoids the use of wires running from the piezoresistive elements 145 to the upper surface 148.

As will readily be appreciated, numerous variations and combinations of the features discussed above can be utilized. For example, while it is preferred that the conductive runs 15, including the pads 14, are formed and cured before the application of resistive ink for forming piezoresistive elements 20 (FIG. 6), the process may be reversed, forming the pads 14 over the cured piezoresistive elements 20. Further, the conductive runs 15 and the piezoresistive elements 20 may both be formed on the diaphragm and then cured together. Also, while the pressure sensors of the invention have been depicted as circular or cylindrical in plan view, other shapes, such as square or rectangular, may also be incorporated where appropriate. As these and numerous other variations and combinations of the features discussed above may be employed without departing from the present invention, the foregoing description of the preferred embodiment should be taken by way of illustration, rather than by way of limitation, of the features discussed above.

What is claimed is:

1. A piezoresistive element for measuring strain on a surface of a substrate, comprising:

first and second metallic pads spaced apart on the surface; and at least two piezoresistive lines formed on the surface and arranged proximate with and substantially parallel to one another, each said piezoresistive line electrically connecting said first and second pads with one another so that said first and second pads are connected to one another by said at least two lines.

2. A piezoresistive element as claimed in claim 1, wherein said metallic pads comprise a noble metal.

3. A piezoresistive element as claimed in claim 1, wherein said metallic pads comprise an alloy of a noble metal.

4. A piezoresistive element as claimed in claim 1, wherein said metallic pads are formed from an alloy of a metal selected from the group consisting of palladium, platinum and gold.

5. A piezoresistive element as claimed in claim 1, wherein said lines comprise lines of a cured resistive ink.

6. A piezoresistive element as claimed in claim 5, wherein each of said lines has a width of less than about 0.80 mm.

7. A piezoresistive element as claimed in claim 5, wherein each of said lines has a width of about 0.1 mm.

8. A piezoresistive element as claimed in claim 5, wherein each of said lines has a length of about 0.70 mm.

9. A piezoresistive element as claimed in claim 5, wherein the ratio of the length to the width of each one of the lines is at least about 7.

10. A piezoresistive element as claimed in claim 5, wherein the ratio of the length to the width of each one of said lines is at least about 1.3.

11. A sensor for measuring pressure of a fluid, comprising:

a disk-like support member having a face with a peripheral raised portion defining a central recess;

a disk-like diaphragm having a first side for facing said fluid and a second side facing said support member, said diaphragm mounted on said peripheral raised portion of said support for deflection into and out of said recess;

circuitry on said second side of said diaphragm having a plurality of pads arranged in pairs; and a plurality of piezoresistive elements disposed on said second side of said diaphragm, each said piezoresistive element comprising at least two lines of cured resistive ink arranged proximate with and substantially parallel to one another, wherein each line of each said piezoresistive element interconnects both pads of a pair with one another so that the pads of each said pair are connected to one another by said at least two lines of one said piezoresistive element.

12. A piezoresistive element for measuring strain on a surface of a substrate, comprising:

first and second metallic pads spaced apart on the surface; and at least one piezoresistive line of a cured resistive ink formed on the surface and electrically connecting said first and second pads, each of said at least one piezoresistive line having a width of about 0.8 mm or less.

13. A piezoresistive element as claimed in claim 12, wherein said metallic pads comprise a noble metal.

14. A piezoresistive element as claimed in claim 12, wherein said metallic pads comprise an alloy of a noble metal.

15. A piezoresistive element as claimed in claim 12, wherein said metallic pads are formed from an alloy of a metal selected from the group consisting of palladium, platinum and gold.

16. A piezoresistive element as claimed in claim 12, wherein each of said lines has a width of about 0.1 mm.

17. A piezoresistive element as claimed in claim 12, wherein each of said lines has a length of about 0.70 mm.

18. A piezoresistive element as claimed in claim 12, wherein the ratio of the length to the width of each one of the lines is at least about 7.

19. A piezoresistive element as claimed in claim 12, wherein the ratio of the length to the width of each one of said lines is at least about 1.3.

20. A piezoresistive element as claimed in claim 1, wherein said piezoresistive lines have the same composition.

\* \* \* \* \*

UNITED STATES PATENT AND TRADEMARK OFFICE
CERTIFICATE OF CORRECTION

PATENT NO. : 5,861,558
DATED : January 19, 1999
INVENTOR(S) : Buhl et al.

It is certified that error appears in the above-identified patent and that said Letters Patent is hereby corrected as shown below:

Title Page, under [75] after "Whitechurch," insert --Hampshire--

Column 11, line 26, delete "-".

Signed and Sealed this

Twenty-fifth Day of May, 1999

Attest:

Attesting Officer

Q. TODD DICKINSON

Acting Commissioner of Patents and Trademarks